US012525035B2

(12) United States Patent
Tong et al.

(10) Patent No.: US 12,525,035 B2
(45) Date of Patent: Jan. 13, 2026

(54) FUSION BASED METHOD FOR IN-VEHICLE VIOLENCE DETECTION USING CAMERAS

(71) Applicant: GM Global Technology Operations LLC, Detroit, MI (US)

(72) Inventors: Wei Tong, Troy, MI (US); Alaa M. Khamis, Courtice (CA); Sai Vishnu Aluru, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 688 days.

(21) Appl. No.: 17/846,548

(22) Filed: Jun. 22, 2022

(65) Prior Publication Data

US 2023/0419690 A1    Dec. 28, 2023

(51) Int. Cl.
| | |
|---|---|
| *G06V 20/59* | (2022.01) |
| *G06T 7/215* | (2017.01) |
| *G06T 7/292* | (2017.01) |
| *G06V 10/25* | (2022.01) |
| *G06V 10/80* | (2022.01) |
| *G06V 20/20* | (2022.01) |

(Continued)

(52) U.S. Cl.
CPC ............ *G06V 20/59* (2022.01); *G06T 7/215* (2017.01); *G06T 7/292* (2017.01); *G06V 10/25* (2022.01); *G06V 10/809* (2022.01); *G06V 20/20* (2022.01); *G06V 20/41* (2022.01); *H04N 23/73* (2023.01); *G06T 2207/30268* (2013.01)

(58) Field of Classification Search
CPC ........ G06V 20/59; G06V 10/25; G06V 10/80; G06V 20/52; G06T 2207/30268; G06T 7/215; G06T 7/292; G06T 2207/30232; G06F 21/566; G08B 31/00
See application file for complete search history.

(56) References Cited

U.S. PATENT DOCUMENTS

| | | |
|---|---|---|
| 10,147,325 B1 | 12/2018 | Copeland et al. |
| 10,768,620 B1 | 9/2020 | Tran |

(Continued)

FOREIGN PATENT DOCUMENTS

| | | | |
|---|---|---|---|
| CN | 111860111 A | 10/2020 | |
| CN | 113570639 A | * 10/2021 | ............... G06T 5/10 |

OTHER PUBLICATIONS

CN-113570639-A—English translation (Year: 2021).*

(Continued)

*Primary Examiner* — Sumati Lefkowitz
*Assistant Examiner* — Aaron Joseph Sorrin
(74) *Attorney, Agent, or Firm* — Vivacqua Crane, PLLC

(57) ABSTRACT

An in-vehicle violence detection and fusion system includes a standard vehicle camera positioned within a vehicle capturing images of at least one occupant of the vehicle. An event camera positioned within the vehicle captures motion images of the at least one occupant. A standard vehicle camera-based region of interest (ROI) signal and an event camera-based ROI signal are received and fused by an ROI fusion module to generate a fused ROI signal. A threat evaluation module receives the fused ROI signal and augments the fused ROI signal with saved data to assist in differentiating normal events from threat events. An event camera-based violence indicator identifies the threat events to the at least one occupant of the vehicle.

14 Claims, 7 Drawing Sheets

(51) Int. Cl.
*G06V 20/40* (2022.01)
*H04N 23/73* (2023.01)

(56) References Cited

U.S. PATENT DOCUMENTS

| | | | |
|---|---|---|---|
| 11,080,987 B2 | 8/2021 | Butler | |
| 11,887,383 B2 | 1/2024 | Turcot et al. | |
| 11,922,787 B1 | 3/2024 | Barcia et al. | |
| 2013/0070928 A1 | 3/2013 | Ellis et al. | |
| 2015/0074532 A1* | 3/2015 | Lapidot | G06F 3/017 715/719 |
| 2016/0078316 A1* | 3/2016 | Sherman | G06F 16/51 348/143 |
| 2016/0189517 A1 | 6/2016 | Weast et al. | |
| 2017/0330044 A1 | 11/2017 | Telpaz et al. | |
| 2018/0068192 A1* | 3/2018 | Miller | G06V 20/59 |
| 2018/0143635 A1 | 5/2018 | Zijderveld et al. | |
| 2018/0229587 A1* | 8/2018 | Gao | B60H 1/00978 |
| 2019/0016343 A1 | 1/2019 | Allen | |
| 2021/0009140 A1 | 1/2021 | Brooks | |
| 2021/0182617 A1 | 6/2021 | Kondo et al. | |
| 2021/0206268 A1 | 7/2021 | Bayer et al. | |
| 2021/0250470 A1 | 8/2021 | Xiang et al. | |
| 2021/0397858 A1* | 12/2021 | Buerkle | B60W 60/0016 |
| 2022/0073068 A1* | 3/2022 | Lavi | B60K 35/28 |
| 2023/0096626 A1* | 3/2023 | Gomita | G06V 10/761 348/362 |
| 2023/0419690 A1 | 12/2023 | Tong et al. | |

OTHER PUBLICATIONS

Imatest, "36-Patch Dynamic Range Charts", 2020. (Year: 2020).*
Jiang, Zhuangyi, et al. Mixed frame-/event-driven fast pedestrian detection. In: 2019 International Conference on Robotics and Automation (ICRA). IEEE, 2019. S. 8332-8338. Aufgerufen Ober: URL:https://ieeexplore. ieee.org/abstracUdocu menU8793924.
Posch, Christoph; Matolin, Daniel; Wohlgenannt, Rainer. A QVGA 143 dB dynamic range frame-free PWM image sensor with lossless pixel-level video compression and time-domain CDS. IEEE Journal of Solid-State Circuits, 2010, 46. Jg., Nr. 1, S. 259-275. Aufgerufen Ober: URL:https://ieeexplore. ieee.org/abstracUdocu menU5648367.
U.S. Appl. No. 17/829,643, filed Jun. 1, 2022.

* cited by examiner

FUSION BASED METHOD FOR IN-VEHICLE VIOLENCE DETECTION USING CAMERAS

INTRODUCTION

The present disclosure relates to a vehicle abnormal or threatening situation recognition system.

Shared mobility technology has matured significantly, as is evident by the appearance of commercially available shared mobility services such as car sharing, ridesharing, ride-hailing and ride-sourcing. Shared autonomous vehicles (SAVs) and pooled shared autonomous vehicles (PSAVs) are also quickly emerging. Sharing a ride with a stranger in a shared autonomous vehicle (SAV) could present risks to a users' personal physical and emotional safety. Perception of crowding and violations of personal space may also be likely when passengers ride-share or ride-pool with strangers.

Thus, while current shared and pooled shared autonomous vehicles achieve their intended purpose, there is a need for a new and improved in-vehicle violence detection and fusion system.

SUMMARY

According to several aspects, an in-vehicle violence detection and fusion system includes a standard vehicle camera positioned within a vehicle capturing images of at least one occupant of the vehicle. An event camera positioned within the vehicle captures motion images of the at least one occupant. A standard vehicle camera-based region of interest (ROI) signal and an event camera-based ROI signal are received and fused by an ROI fusion module to generate a fused ROI signal. A threat evaluation module receives the fused ROI signal and augments the fused ROI signal with saved data to assist in differentiating "normal" events from violent or "threat" events. An event camera-based violence indicator identifies the threat events to the at least one occupant of the vehicle.

In another aspect of the present disclosure, a privacy masking module applying a privacy masking to secure privacy of the at least one occupant of the vehicle. The privacy masking module receives an output of the standard vehicle camera and generates the standard vehicle camera-based region of interest (ROI) signal.

In another aspect of the present disclosure, an event camera-based proposal module receives output signals from the event camera and outputs the event camera-based ROI signal.

In another aspect of the present disclosure, a body skeleton detection and tracking module receives images from the privacy masking module and distinguishes human anatomy within the vehicle based on the saved data retrieved from a database in a memory of a computer having saved images of human shapes and movements.

In another aspect of the present disclosure, a violent object detection module receives images from the privacy masking module and distinguishes dangerous activity objects detected within the vehicle.

In another aspect of the present disclosure, an abnormal exposure identifier receives an output from the event camera. The abnormal exposure identifier distinguishes normal light and contrast exposure from high contrast exposure. If the abnormal exposure identifier determines that the output from the event camera exceeds a predetermined event camera output threshold an abnormal exposure signal is generated.

In another aspect of the present disclosure, a standard vehicle camera exposure adjustment module receives the abnormal exposure signal and generates and sending exposure change signals to the standard vehicle camera.

In another aspect of the present disclosure, a human recognition module receives data output from the standard vehicle cameras to distinguish human-based camera image motion. A motion estimation module in communication with the event cameras provides event camera image recognition of an estimated image output. An action recognition module in communication with the human recognition module and the motion estimation module combines outputs of the motion estimation module and the human recognition module for comparison of camera image data to the saved data having previously captured and saved images of human action.

In another aspect of the present disclosure, the event camera has a high speed defining a speed less than 1 ms. The standard vehicle camera operates at a low speed defining less than 60 fps speed.

In another aspect of the present disclosure, the event camera has a high dynamic range defining a range greater than 140 db. The standard vehicle camera has a low dynamic range defining a range less than 100 db.

According to several aspects, a method to detect and fuse in-vehicle violence using cameras comprises: positioning a standard vehicle camera within a vehicle capturing images of at least one occupant of the vehicle; locating a high speed event camera within the vehicle capturing motion images of the at least one occupant; dividing a camera image into grids differentiated as positive and negative events, the grids having multiple grid cells individually having a count quantity indicating a quantity of changed events registered in the grid cells representing the camera image over a time interval; creating a circular buffer to track quantity changes in individual ones of the multiple grid cells over the time interval; updating the event count for every time interval $\Delta_t$, where $\Delta_t = t_{k+1} - t_k$, and populating a next grid; moving a pointer to a next one of the grid cells, and updating the next one of the grid cells; and identifying a changing count of the grid cell using a circular buffer.

In another aspect of the present disclosure, the method further includes identifying a positive event grid by an overall increasing count of events in the grid cell indicating an increasing quantity of motion events over the time interval.

In another aspect of the present disclosure, the method further includes identifying a negative event grid by an overall decreasing count of events in the grid cell indicating a decreasing quantity of motion events over the time interval.

In another aspect of the present disclosure, the method further includes: identifying when an overall positive (+) event count occurs in a majority of the grid cells of one of the grids acting to increase an overall scene brightness; and reducing an exposure for the standard vehicle camera.

In another aspect of the present disclosure, the method further includes: identifying when an overall negative (−) event count occurs in a majority of the grid cells of one of the grids acting to decrease an overall scene brightness; and increasing an exposure for the standard vehicle camera.

In another aspect of the present disclosure, the method further includes deleting an expired event count if no change in the count has been registered by filling in the event count of one of the grid cells unchanged from a previous event count with a quantity zero (0).

In another aspect of the present disclosure, the method further includes: applying the event camera to optimally provide regions of interest (ROI) with fast motion; using the standard vehicle camera to provide ROI regions with humans; combining an ROI region from the event camera and an ROI region of the standard vehicle camera; calculating a weight (w) for individual grids based on +/− event counts where: $w_{event}=w_+f(c_+)+w_-f(c_c)$; and determining an ROI region having a maximum weighting to fit in a downstream receptive field.

According to several aspects, a method to detect and fuse in-vehicle violence using cameras, comprises: positioning a standard vehicle camera within a vehicle capturing images of at least one occupant of the vehicle; locating an event camera within the vehicle capturing motion images of the at least one occupant; generating a standard vehicle camera-based region of interest (ROI) signal; generating an event camera-based ROI signal; applying an ROI fusion module to receive and fuse the event camera-based ROI signal and the standard vehicle camera-based ROI signal and to generate a fused ROI signal; sending the fused ROI signal to a threat evaluation module to augment the fused ROI signal with saved data to assist in differentiating normal events from violent or threat events; and identifying the threat events to the at least one occupant of the vehicle using an event camera-based violence indicator.

In another aspect of the present disclosure, the method further includes consolidating the violence indicator applying contextual information including a vehicle location and a time of day.

In another aspect of the present disclosure, the method further includes: applying a privacy masking to secure privacy of the at least one occupant of the vehicle; and forwarding an output of the standard vehicle camera to a privacy masking module to generate the standard vehicle camera-based region of interest (ROI) signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
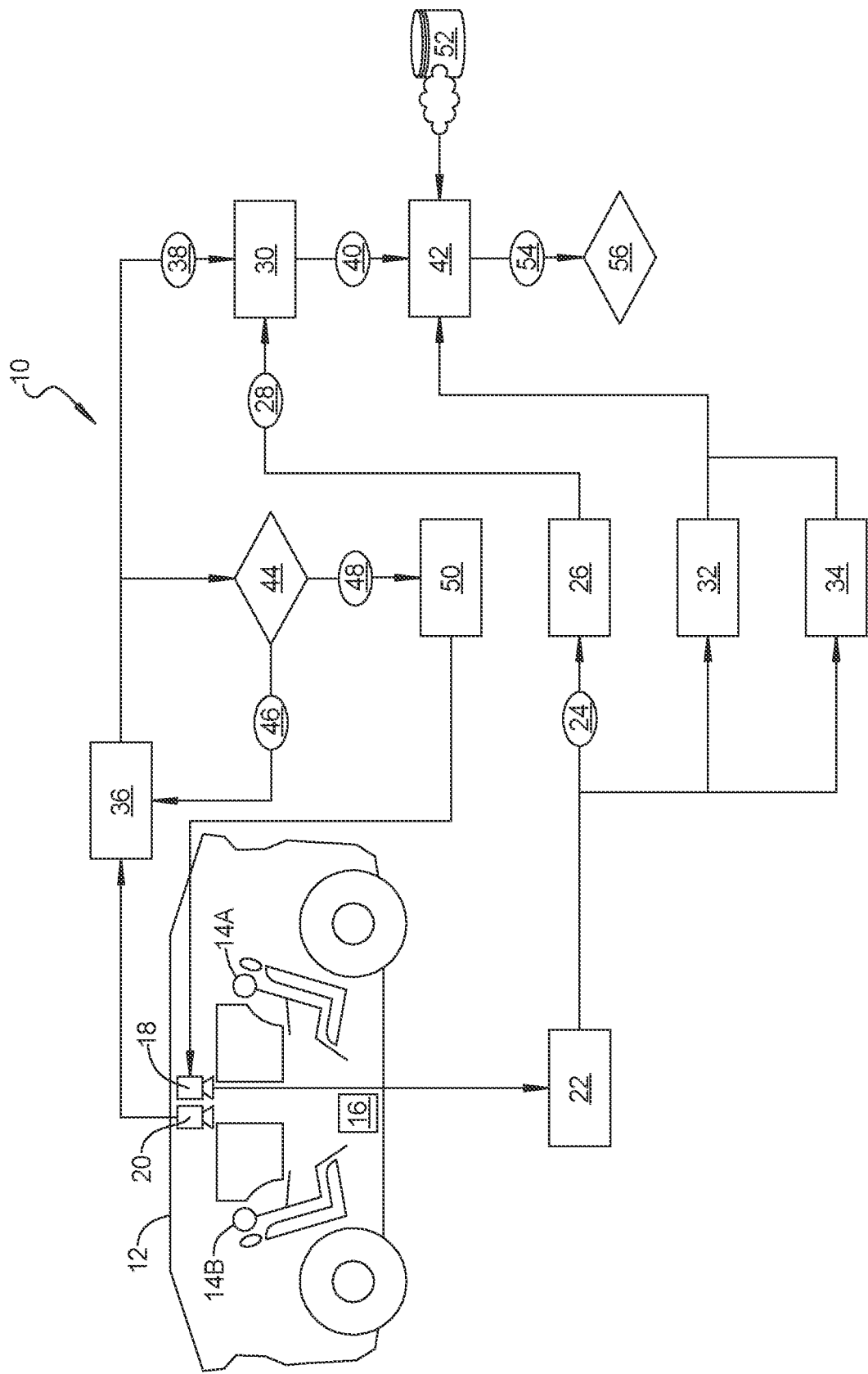
FIG. 1 is a system diagram identifying an in-vehicle violence detection and fusion system according to an exemplary aspect.

Referring to FIG. 1, an in-vehicle violence detection and fusion system 10 is provided with a vehicle 12 including but not limited to an autonomous vehicle including but not limited to shared autonomous vehicles (SAVs) and pooled shared autonomous vehicles (PSAVs) and shuttle buses. The in-vehicle violence detection and fusion system 10 provides multiple devices used for recognition of violence including vision threats which may impact a vehicle occupant 14 such as a driver or operator first occupant 14A and one or more front or rear passenger second occupants 14B. The in-vehicle violence detection and fusion system 10 identifies violence levels and categorizes the violence levels. As will be discussed below, the identified violence levels may be characterized as a low level, a medium level and a high level, and violence levels may be further distinguished depending on an area of operation of the vehicle 12.

Control of the in-vehicle violence detection and fusion system 10 may be performed using an individual device such as a computer 16, a software component or an on-board computer, hereinafter collectively referred to as the computer 16. The computer 16 may be deployed in the vehicle 12 with perception capabilities. The computer 16 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

The in-vehicle violence detection and fusion system 10 also includes multiple in-vehicle cameras which generate in-vehicle camera data relating to occupant positions, occupant movements and objects detected over time. The multiple in-vehicle cameras include at least one standard vehicle camera 18. The standard vehicle camera 18 is a camera similar to cameras provided on many different vehicle designs and provides optimized appearance details but is not optimized for fast motion resolution. The standard vehicle camera 18 operates at low speed, defined herein as less than <60 fps speed, has a low dynamic range defining a range less than 100 db and requires very high computing power to analyze camera output data in real time. To provide high speed camera data, the multiple in-vehicle cameras also include at least one event camera 20. The event camera 20 is optimized for detecting fast motion but is not optimal for providing appearance details. The event camera 20 provides a high dynamic range defining a range greater than 140 db and a high speed defining a speed less than 1 ms. The event camera 20 generates no intensity and a polarity of (−1, +1), only a single pixel output (x,y,t,p) and a low resolution defining a resolution less than 1 m pixels.

An output including image signals from the one or more standard vehicle cameras 18 is forwarded to a privacy masking module 22 which generates and forwards a masked image sequence 24 to a standard camera ROI fusion module 26. The standard camera ROI fusion module 26 generates a standard vehicle camera-based ROI signal 28 which is forwarded to an ROI fusion module 30. An output of the privacy masking module 22 is also forwarded in parallel to a body skeleton detection and tracking module 32 and to a violent object detection module 34. The body skeleton detection and tracking module 32 distinguishes human anatomy within the vehicle 12 using comparative algorithms based on data retrieved from a database in a memory of the computer 16 having saved images of human shapes and movements. The violent object detection module 34 distinguishes objects detected within the vehicle 12 between objects associated with dangerous activity such as guns, knives and the like from objects normally present such as bags, purses, clothing, and the like using comparative algorithms based on data retrieved from a database in a memory of the computer 16.

Output signals from the event camera 20 are forwarded to an event camera-based ROI proposal module 36 which outputs an event camera-based ROI signal 38 to the ROI fusion module 30. The standard vehicle camera-based ROI signal 28 and the event camera-based ROI signal 38 are fused by the ROI fusion module 30 to generate a fused ROI signal 40 which is forwarded to a threat evaluation module 42. The body skeleton detection and tracking module 32 and the violent object detection module 34 in parallel also forward an output to the threat evaluation module 42.

The output from the event camera 20 operating at high speed may also be used to enhance a capability of the standard vehicle cameras 18 during a light change event or if a high contrast event such as vehicle entry from daylight into a tunnel occurs. An exposure of the standard vehicle cameras 18 may be adjusted during these events. For example, the output from the event camera 20 may be forwarded to an abnormal exposure identifier 44 in parallel with the ROI fusion module 30. The abnormal exposure identifier 44 distinguishes normal light and contrast exposure from high contrast exposure. If the abnormal exposure identifier 44 determines that the output from the event camera 20 does not exceed a predetermined event camera output threshold a no-abnormal exposure signal 46 is generated and forwarded to the event camera-based ROI proposal module 36 for continued evaluation. If the abnormal exposure identifier 44 determines that the output from the event camera 20 exceeds the predetermined event camera output threshold an abnormal exposure signal 48 is generated and forwarded to a standard vehicle camera exposure adjustment module 50. The standard vehicle camera exposure adjustment module 50 generates and signals exposure change signals to one or more of the standard vehicle cameras 18.

The threat evaluation module 42 receives the fused ROI signal 40 from the ROI fusion module 30 and the outputs from the body skeleton detection and tracking module 32 and the violent object detection module 34 and augments this information with additional data to assist in differentiating normal events from violent or threat events. For example, an outside source 52 such as a cloud-based system may provide a priori information such as an area of travel wherein known violence has occurred and a past history record of different normal versus threat behavioral events to use for comparison purposes. Contextual information may also be received from the outside source 52 which may include data distinguishing different areas the vehicle 12 will travel through and rates of or different types of violence that may occur at different times of day or night. For example, a high crime area may have abnormally high rates of robbery after 10:00 pm, or areas may be historically deemed safe during an early morning or afternoon period. The outside source 52 may also provide occupant information from a SAV booking database, for example when a ride-share or ride-pool request is made by one of the first occupant 14A or the second occupant 14B. The threat evaluation module 42 uses the above input, plus saved and collected information to generate an event camera-based threat indicator 54 identifying threats to the occupants 14 of the vehicle 12 for further analysis and confirmation using a violence threat assessment unit 56.

It is noted the outside source 52 may further include a monitoring and reporting system such as OnStar® which may further result in communication of the violence assessment together with emergency contact and identification information related to the vehicle 12 being forwarded to an emergency service such as a 911 operator.

The threat evaluation module 42 forwards potential threat information including the threat indicator 54 to the threat assessment unit 56. If the threat assessment unit 56 confirms there is no active threat a no-threat signal is generated which effectively ends this threat assessment of the potential threat information received by the threat evaluation module 42. If an active threat signal is generated by the threat assessment unit 56 from the data received from the threat evaluation module 42, a threat confirmation request is generated Referring to FIG. 2 and again to FIG. 1, a vision-based scene flow diagram 58 identifies how data from the standard vehicle cameras 18 and the event camera 20 are used by the in-vehicle violence detection and fusion system 10. The event camera 20 and the standard vehicle cameras 18 communicate with a calibrator 60 that combines camera images and identifies correspondence of pixels of the standard vehicle cameras 18 and the event camera 20 to correlate the images of the event camera 20 to the standard vehicle cameras 18. Data output from the standard vehicle cameras 18 is forwarded to a human recognition module 62 used to distinguish human-based camera image motion. The event cameras 20 communicate with a motion estimation module 64 which allows event camera image recognition providing an estimated image output. The human recognition module 62 and the motion estimation module 64 together communicate with an action recognition module 66 to combine data and signal outputs of the motion estimation module 64 and the human recognition module 62 for comparison of image data to a database containing previously captured and saved images of human action. An output of the action recognition module 66 defining for example a detected human motion signal is forwarded to an event detection module 68 which is in communication with the outside source 52 to retrieve outside source data and combine the outside source data with a threshold indicating human motion of a threatening degree from the event detection module 68. An output 70 of the event detection module 68 similar to the threat indicator 54 may be forwarded to the threat assessment unit 56 described in reference to FIG. 1.

A second fusion of threat assessment data may be performed using output data from the standard vehicle cameras 18 and the event camera 20 as a combined input to an ultra-high frame rate video reconstruction module 72. The ultra-high frame rate video reconstruction module 72 is able to distinguish between occupant motion rates which are less than a predetermined motion rate threshold designating normal human motion and which are greater than the predetermined motion rate threshold designating a threatening human motion, such as a rapid motion of one occupant toward another occupant of the vehicle 12. An output of the ultra-high frame rate video reconstruction module 72 is also forwarded to the action recognition module 66.

Figure 2:
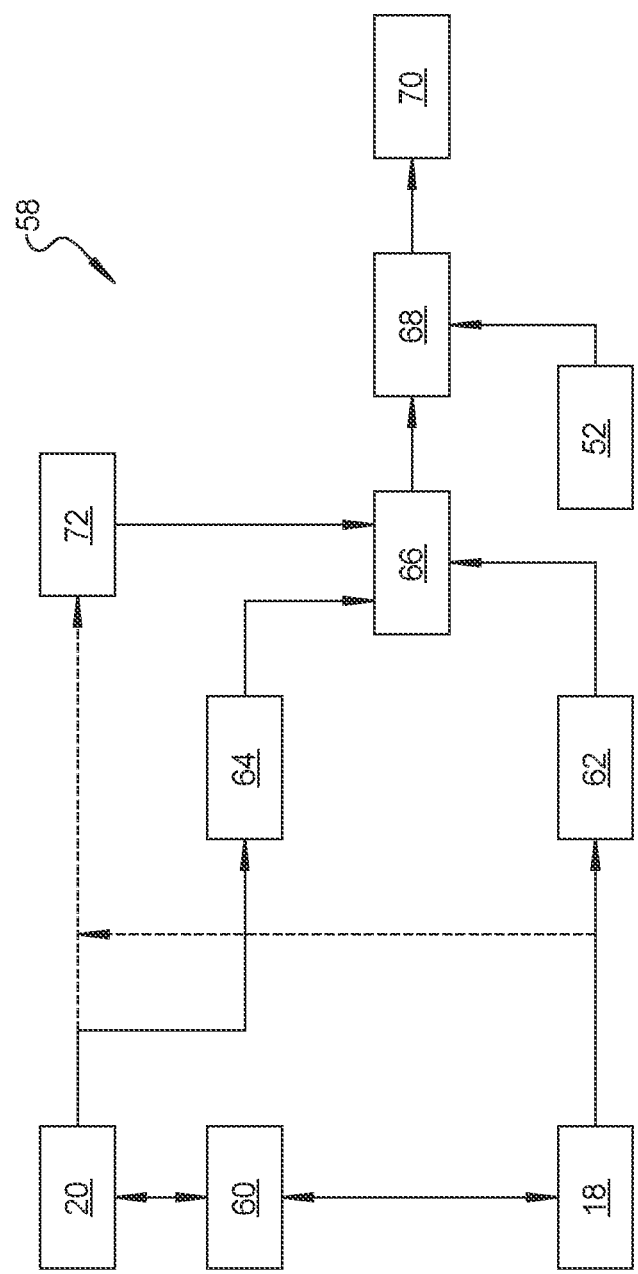
FIG. 2 is a vision-based scene flow diagram defining a portion of the system of FIG. 1.

Referring to FIG. 3 and again to FIGS. 1 and 2, the in-vehicle violence detection and fusion system 10 of the present disclosure is operated as follows. A camera image is divided into grids differentiated as positive and negative events, such as a first positive event grid 74A defined at a first time and a first negative event grid 76. Individual grid cells 78 have a count quantity 80 indicating a quantity of changed events registered in that cell or section of the camera image over a time interval $t_k$. A positive event grid is defined by an overall increasing count of events in a grid and indicates an increasing quantity of motion events over the time interval $t_k$. A negative event grid is defined by an overall decreasing count of events in a grid and indicates a decreasing quantity of motion events over the time interval $t_k$. For each grid a circular buffer 82 is created to count or track quantity changes in individual ones of the grid cells 78 or the time interval $t_k$.

Figure 3:
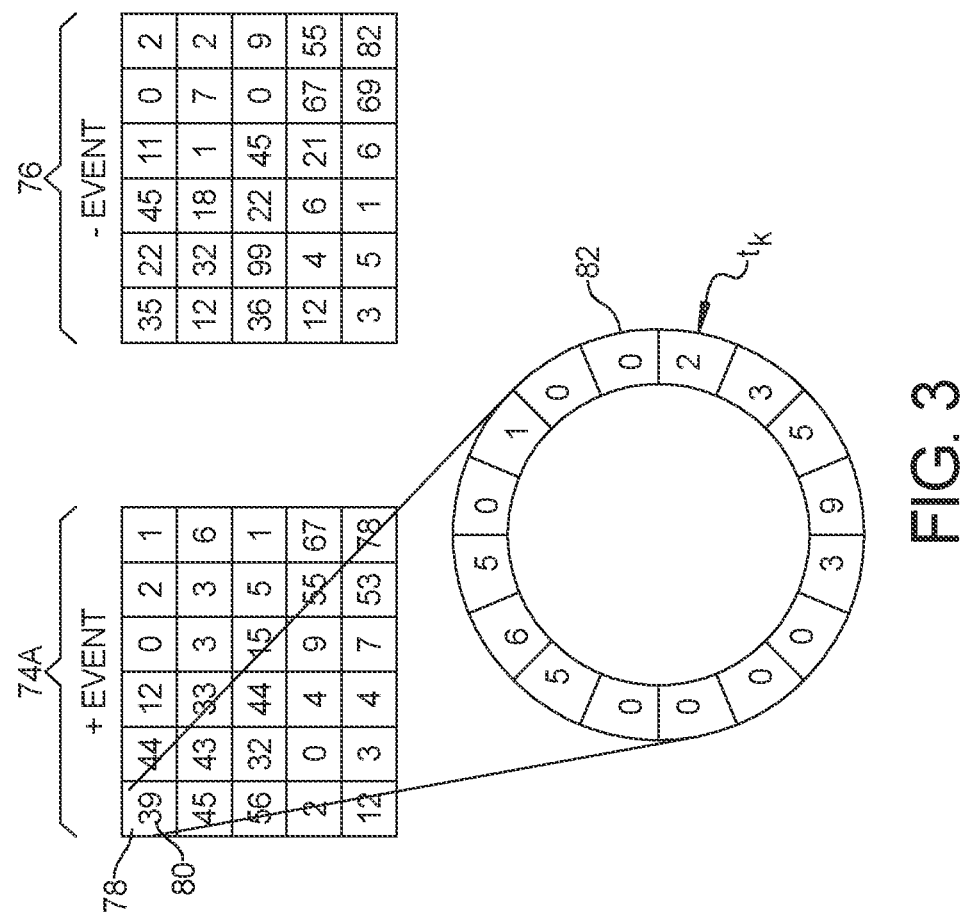
FIG. 3 is a positive and a negative event grid output by the system of FIG. 1.

Referring to FIG. 4 and again to FIG. 3, for every time interval $\Delta_t$, where $\Delta_t = t_{k+1} - t_k$, the event count is updated, and a new or next grid is populated, such as the first grid 74B defined at a second time. For each grid, a pointer 84 is then moved to a next one of the cells 86, and the cell 86 is updated with a new event count. If no change in the count has been registered a negative count is not registered however, an expired event count is deleted by filling in the event count of the appropriate cell such as exemplary cell 88 with a quantity zero (0) which was unchanged from a previous event count. A circular buffer 90 identifies the changing count of the cell 86.

If an overall positive (+) event count in most grids increases, the overall scene becomes brighter, which may require reducing an exposure for the standard vehicle cameras 18 as discussed in reference to FIG. 1 and below. If an overall negative (−) event count in most grids increases, the overall scene becomes darker. This may require increasing an exposure for the standard vehicle cameras 18.

Figure 4:
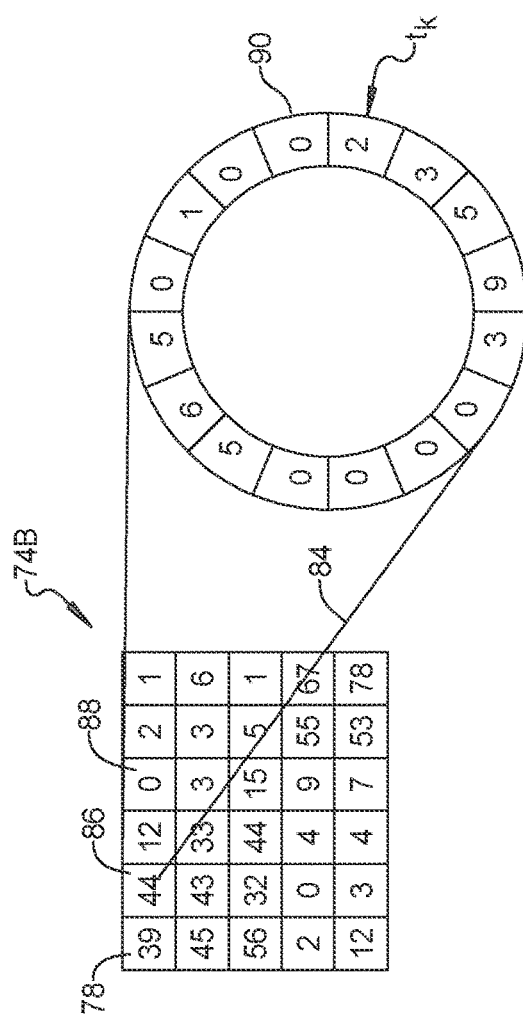
FIG. 4 is the positive event grid of FIG. 3 showing updated data.

Referring to FIG. 5 and again to FIGS. 3 and 4, the event count has again been updated, and a new or next grid is populated, such as the modified first grid 74C defined at a third time. The overall positive (+) event count has increased signified by an increased value or count 92 in the cell 86, increasing from 44 in the modified first grid 74B shown in FIGS. 4 to 67 in the modified first grid 74C. A circular buffer 94 tracks the increasing count of the cell 86. The increased overall positive (+) is further signified by an increased value or count 96 in a cell 98, increasing from 12 in the modified first grid 74B shown in FIGS. 4 to 34 in the modified first grid 74C. A circular buffer 100 tracks the increasing count of the cell 98.

Figure 5:
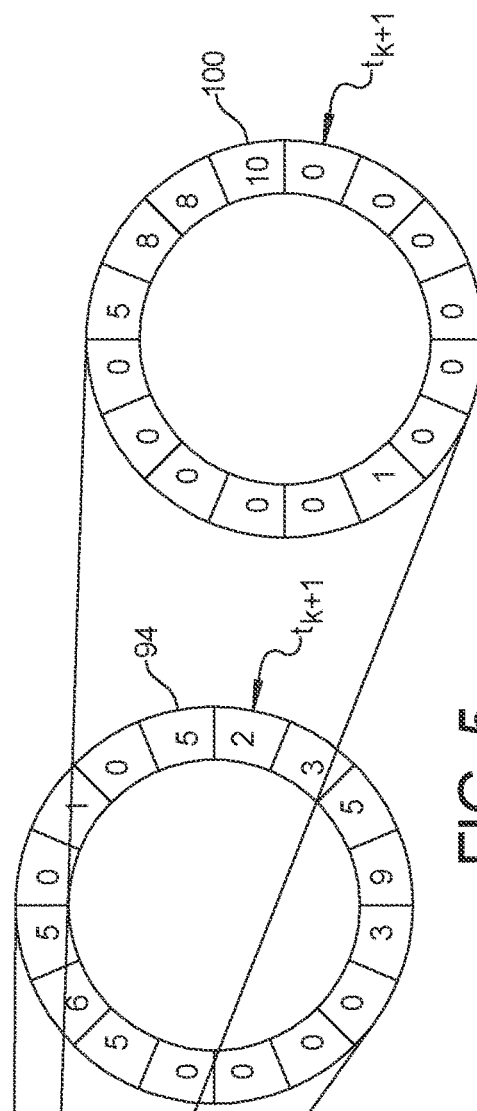
FIG. 5 is the positive event grid of FIG. 4 showing updated data.
Figure 5:
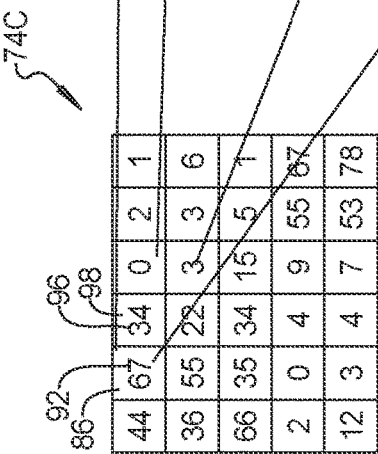
Figure 6:
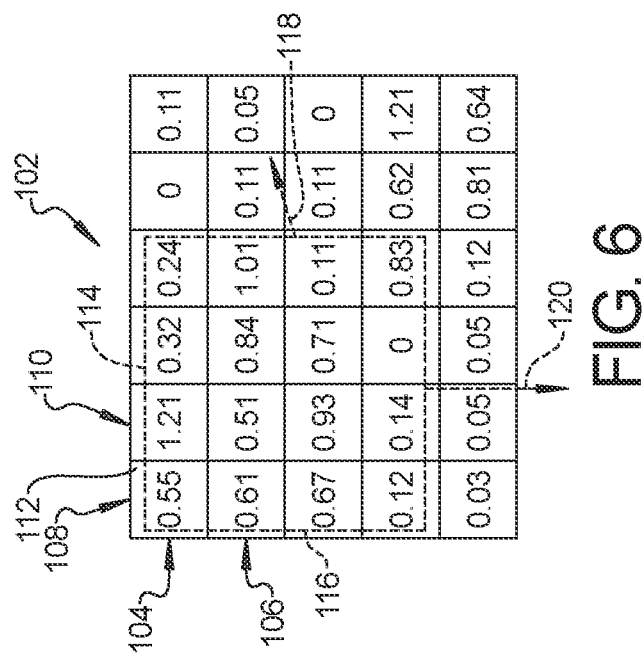
FIG. 6 is a grid having calculated values of weights used to fuse data of the system of FIG. 1.
Figure 7:
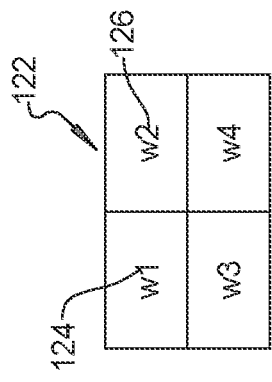
FIG. 7 is a grid having final weight values.

As the overall positive (+) event count in most grids has increased as signified in FIG. 5 compared to FIG. 4, the overall scene becomes brighter, which permits reducing an exposure for the standard vehicle cameras 18. The event camera 20 provides guidance for exposure control of the standard vehicle cameras 18. The event camera 20 is selected for use to optimally provide ROI regions with fast motion. The standard vehicle cameras 18 are optimum to provide ROI regions with humans. An ROI region from the event camera 20 and one or more ROI regions of the standard vehicle cameras 18 are combined and a weighting is added. An ROI region with a maximum weighting is then determined which can fit in a downstream receptive field. Optionally, regions to tile downstream of the receptive field are selected and combined with the ROI.

An exposure adjustment amount may be calculated using equation 1 below.

$$\Delta_{Exp} \propto -\Delta_{event} \qquad \text{Equation 1:}$$

A weight for each grid is then calculated based on +/− event counts using equation 2 below.

$$w_{event} = w_+ f(c_+) + w_- f(c_-) \qquad \text{Equation 2:}$$

Where:
$c_+$ and $c_-$ are the event counts for positive and negative events of each grid;
$w_+$ and $w_-$ are the weighting parameters for + event counts and − event counts; and
$f(c)$ is a function for converting event count to proper weights.

Humans are then detected and identified in the scene using the standard vehicle cameras 18. Standard vehicle camera weights are calculated for each grid based on a location of the detected humans, for example applying a gaussian weighting using Equation 3 below.

$$w_{regular} = \exp^{-d/\sigma} \qquad \text{Equation 3:}$$

Where:
d is distance from a grid to the center of mass of a detected human; and
$\sigma$ is a parameter for gaussian weighting.

The weights of a grid from the event camera 20 and from one or more of the standard vehicle cameras 18 are then fused using Equation 4 below.

$$w = \alpha w_{event} + \beta w_{regular}, \qquad \text{Equation 4:}$$

Where:

$$\alpha + \beta = 1, 0 \leq \alpha, \beta \leq 1$$

$\alpha$ is a predetermined event value; and
$\beta$ is a predetermined standard camera or regular value.

Referring to FIG. 6 and again to FIGS. 3 through 5, to find a candidate region for downstream processing, the following steps are used. First, a table or grid 102 is generated having the values of weights calculated above populated in multiple rows such as exemplary rows 104, 106 and multiple columns such as exemplary columns 108, 110 defining multiple grids 112. A window 114 with a same side 116 as a downstream receptive field is found. Second, the window 114 is slid over the grids 112 in a first direction 118 or a second direction 120 and a sum of the weights in successive grids 112 of the window 114 is determined. Third, the position of the window 114 having a highest overall weight is selected.

Referring to FIG. 7 and again to FIGS. 3 through 6, in a fourth step, a window 122 with a fraction of the downstream receptive field, for example ¼ size of the window 114 is created. In a fifth step, the window 122 is slid over the grids and a sum of the weights in individual next successive windows is determined. In a sixth step, windows having the top overall weights are selected. In seventh step, the selected window is tiled to fill in the receptive field.

Table 1 below identifies an approach to identify fused threat estimates.

TABLE 1

| Overlapping Skeletons | Threatening Objects | Fused Threat Estimate (FTE) |
|---|---|---|
| No | No | No violence |
| Yes | No | Low Violence |
| No | Yes | Medium Violence |
| Yes | Yes | High Violence |

Table 2 below identifies an approach to consolidating violence estimates.

TABLE 2

| Violence Estimate | Contextual Information | | Consolidated Violence Estimate (CTE) |
|---|---|---|---|
| | Location | Time | |
| No Violence | Any | Any | No Violence |
| Low Violence | Safe Area | Normal | Low Violence |
| Low Violence | Safe Zone | Too Early/Too Late | High Violence |
| Low Violence | Dangerous Zone | Normal | High Violence |
| Low Violence | Dangerous Zone | Too Early/Too Late | High Violence |
| High Violence | Safe Area | Normal | High Violence |
| High Violence | Safe Zone | Too Early/Too Late | High Violence |
| High Violence | Dangerous Zone | Normal | High Violence |
| High Violence | Dangerous Zone | Too Early Too Late | High Violence |

Other approaches may be used to fuse the two indicators such as: 1) Using a weight scheme that combines the two indicators using weights that are inversely proportional with an uncertainty of each violence indicator quantified using its variance; or 2) Using Dempster's rule of combination that takes into consideration a degree of belief of each violence indicator.

Referring to FIG. 8 and again to FIGS. 1 through 7, the event camera 20 identifies regions having fast motion and combines the regions having fast motion with human regions identified by the standard vehicle cameras 18. The downstream threat evaluation module 42 only needs to focus on regions that were identified in a previous step which significantly reduces a computing cost and improves computing accuracy. The body skeleton detection and tracking module 32 forwards data to an overlapping skeleton segments or bounding module 126 which boxes overlapping skeleton segments or bounding as violence indicators. An output of the overlapping skeleton segments or bounding module 126 is directed to an intersection query unit 128. If a no intersection of the data signal 130 is generated the program returns to the overlapping skeleton segments or bounding module 126. If an intersection of the data signal 132 is generated the program moves to the threat evaluation module 42.

Information fusion is performed between the event camera-based threat indicator 54 and the standard vehicle camera-based violence indicator 140 using combinatorial logic (OR or AND) or using a weight scheme that combines the two indicators using weights that are inversely proportional, with the uncertainty of each violence indicator quantified using its variance or by using Dempster's rule of combination that takes into consideration a degree of belief of each violence indicator. Violence indicator consolidation is performed using contextual information such as location, time of the day and the like. Different actions may be recommended according to the threat level identified.

Referring to FIG. 9 and again to FIGS. 1 through 8, a standard vehicle camera-based privacy masking 142 uses the privacy masking module 22 identified in reference to FIG. 1 to secure the privacy of the occupants 14 of the vehicle 12 including self-driving vehicles, shared vehicles and shuttle buses. Violence detection using the standard vehicle cameras 18 uses the body skeleton detection and tracking module 32 and the overlapping skeleton segments or bounding module 126 to develop overlapping skeleton segments 144, 146.

Figure 8:
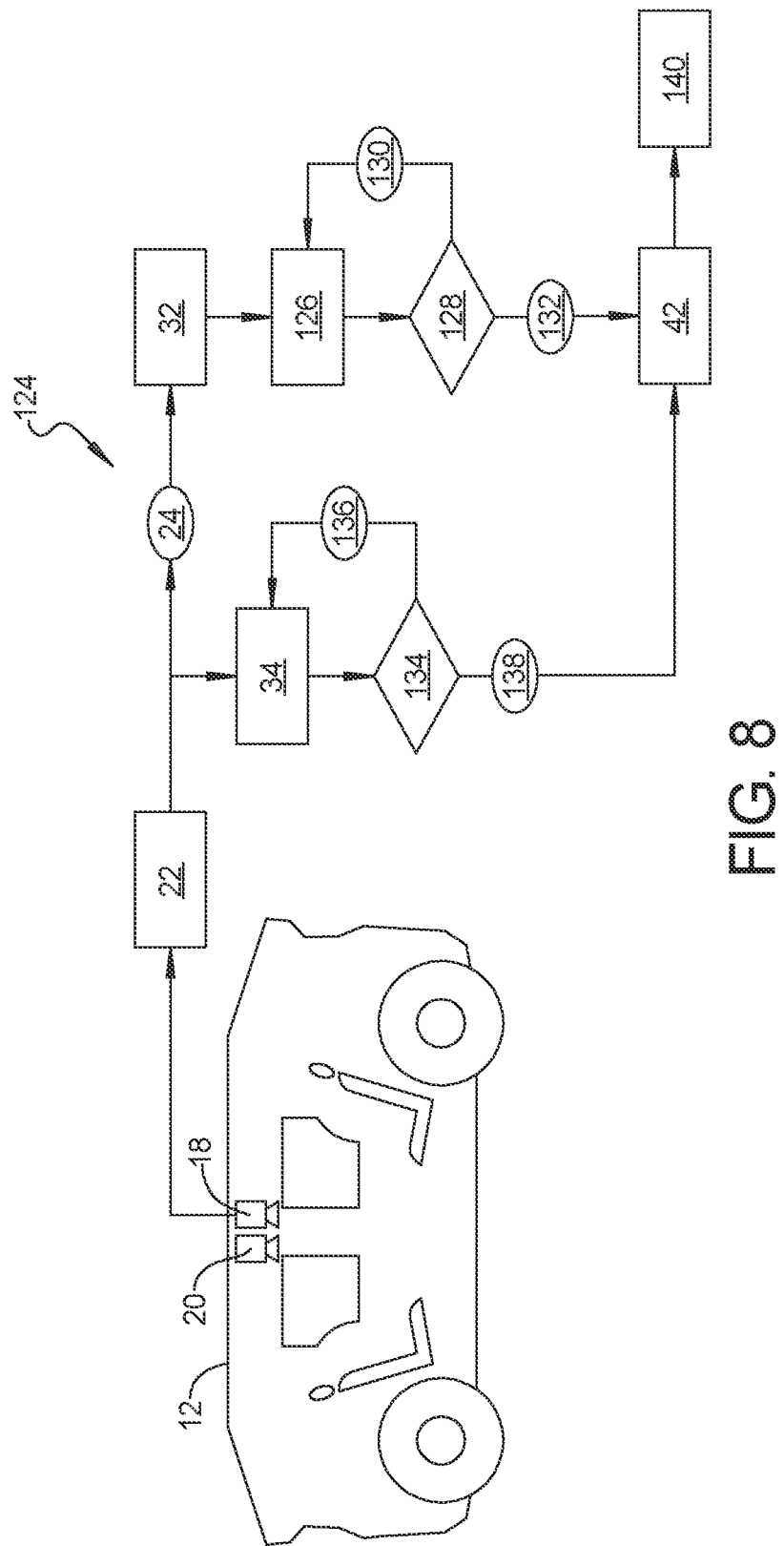
FIG. 8 is a system diagram identifying standard vehicle camera data generation of a standard vehicle camera-based violence indicator.
Figure 9:
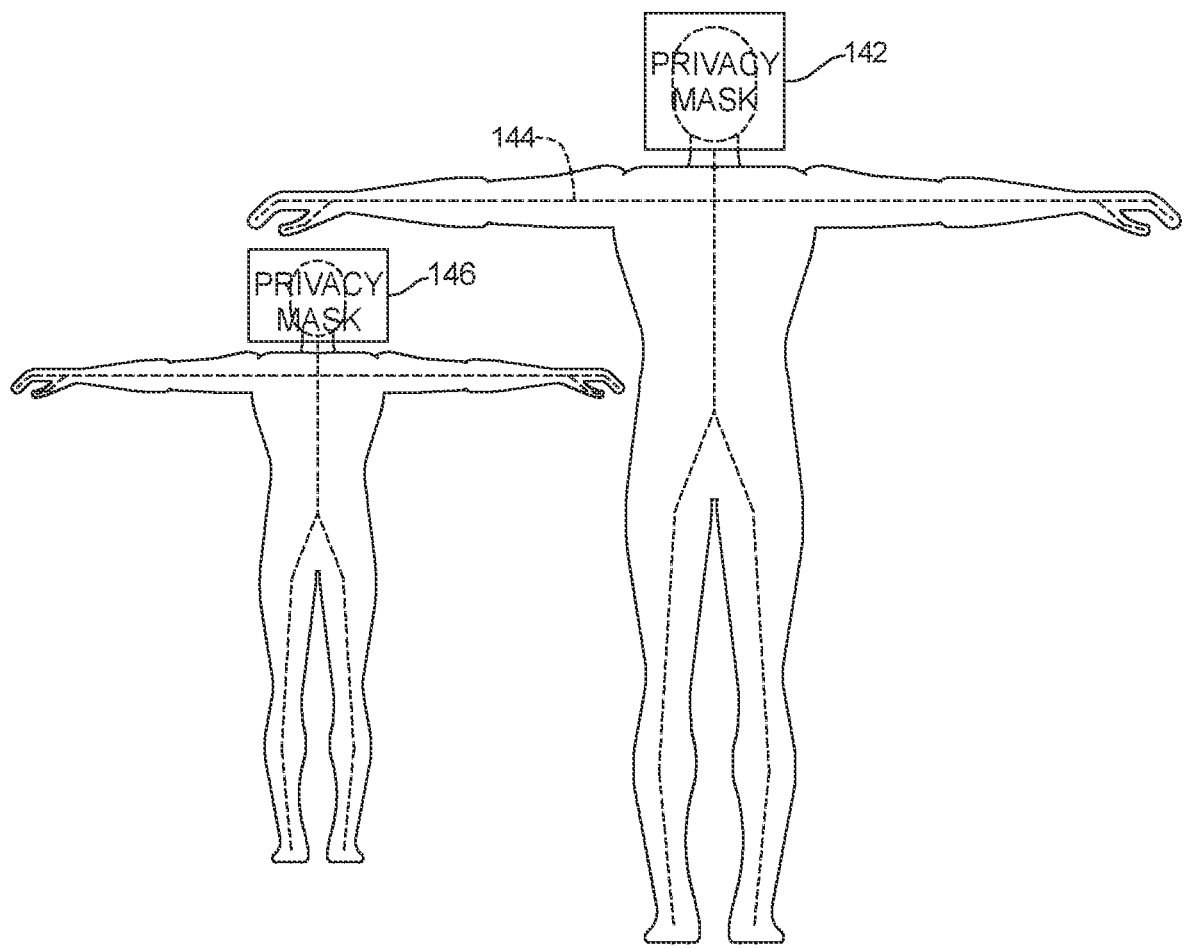
FIG. 9 is a front elevational view looking rearward of an exemplary vehicle showing overlapping skeleton segments generated by the system of FIG. 1.
Figure 10:
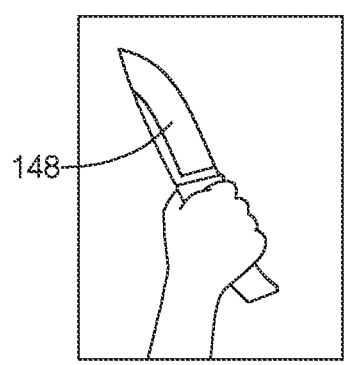
FIG. 10 is a front elevational view looking rearward of an exemplary vehicle showing a bounded threating object generated by the system of FIG. 1.

Referring to FIG. 10 and again to FIGS. 8 and 9, detection of threatening objects such as weapons 148 including sharp objects including knives and swords, guns and firearms or martial arts and self-defense items is performed using the violent object detection module 34. If the violent object detection module 34 generates a no threat signal 136 the program returns to the violent object detection module 34 for further monitoring. If the violent object detection module 34 generates a threat signal 138 the program moves to the threat evaluation module 42.

An in-vehicle violence detection and fusion system 10 of the present disclosure applies algorithms to generate ROI regions from the event camera 20. The event camera 20 is used to guide standard vehicle camera 18 exposure control. A method is provided to fuse ROIs from the event camera 20 and the standard vehicle cameras 18. Algorithms generate candidate regions for down-stream processing. The standard vehicle camera-based violence detection uses overlapping skeleton segments or bounding boxes as violence indicators and for detection of threatening objects. Information fusion is performed between the event camera-based threat indicator 54 and the standard vehicle camera-based violence indicator 140. Violence indicator consolidation is performed using contextual information such as location, time of the day and the like.

An in-vehicle violence detection and fusion system 10 of the present disclosure offers several advantages. These include a system and method for detecting in-cabin or in-vehicle violence using the standard vehicle cameras 18. A fusion method exploits the complementary attributes of the event camera 20 having a high dynamic range and a high speed, and an in-vehicle camera having high resolution and rich details to detect in-cabin or in-vehicle violence. More specifically, the event camera 20 is used to identify regions with fast motion occurring which are combined with human regions identified by the standard vehicle cameras 18. The downstream threat evaluation module 42 only needs to focus on regions that were identified in a previous step which significantly reduces the computing cost and improves the accuracy of violence detection.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to detect and fuse in-vehicle violence using cameras, comprising:
    providing a standard vehicle camera within a vehicle capturing images of at least one occupant of the vehicle;
    providing an event camera within the vehicle capturing motion images of the at least one occupant;
    generating a standard vehicle camera-based region of interest (ROI) signal;
    generating an event camera-based ROI signal;

wherein generating the standard vehicle camera-based ROI signal and generating the event camera ROI signal includes:
dividing the camera images from the standard vehicle camera and the motion images from the event camera into grids differentiated as positive and negative events, the grids having multiple grid cells individually having an event count quantity indicating a quantity of changed events registered in the grid cells representing the camera image over a time interval;
creating a circular buffer to track quantity changes in individual ones of the multiple grid cells over the time interval;
updating the event count quantity for every time interval $\Delta_t$, and populating a next grid having multiple grid cells;
moving a pointer to a next one of the grid cells of the next grid, and updating the next one of the grid cells; and
identifying a changing count of the next one of the grid cells using a circular buffer;
applying an ROI fusion module to receive and fuse the event camera-based ROI signal and the standard vehicle camera-based ROI signal and to generate a fused ROI signal;
sending the fused ROI signal to a threat evaluation module to augment the fused ROI signal with saved data to assist in differentiating normal events from violent or threat events; and
identifying the threat events to the at least one occupant of the vehicle using an event camera-based violence indicator.

2. The method of claim 1, further including detecting and tracking body skeletons by receiving images from a privacy masking module and distinguishing human anatomy within the vehicle based on the saved data retrieved from a database in a memory of a computer having saved images of human shapes and movements.

3. The method of claim 1, further including detecting violent objects by receiving images from a privacy masking module and distinguishing dangerous activity objects detected within the vehicle.

4. The method of claim 1, further including identifying abnormal exposure by receiving an output from the event camera, distinguishing normal light and contrast exposure from high contrast exposure, and generating an abnormal exposure signal if the output from the event camera exceeds a predetermined event camera output threshold.

5. The method of claim 4, further including adjusting standard vehicle camera exposure by receiving the abnormal exposure signal and generating and sending exposure change signals to the standard vehicle camera.

6. The method of claim 1, wherein:
the event camera has a high speed capturing images in less than 1 ms; and
the standard vehicle camera operates at a low speed less than 60 fps.

7. The method of claim 6, wherein:
the event camera has a high dynamic range defining a range greater than 140 db; and
the standard vehicle camera has a low dynamic range defining a range less than 100 db.

8. The method of claim 1, further including identifying a positive event grid by an increasing count of events in the grid cell indicating an increasing quantity of motion events over the time interval.

9. The method of claim 8, further including identifying a negative event grid by a decreasing count of events in the grid cell indicating a decreasing quantity of motion events over the time interval.

10. The method of claim 1, further including:
identifying when an overall positive (+) event count occurs in a majority of the grid cells of one of the grids indicating an increase in an overall scene brightness; and
reducing an exposure for the standard vehicle camera.

11. The method of claim 1, further including:
identifying when an overall negative (−) event count occurs in a majority of the grid cells of one of the grids indicating a decrease in an overall scene brightness; and
increasing an exposure for the standard vehicle camera.

12. The method of claim 1, further including deleting an expired event count if no change in the count has been registered by filling in the event count of one of the grid cells unchanged from a previous event count with a quantity zero (0).

13. The method of claim 1, further including consolidating the event camera-based violence indicator by applying contextual information including a vehicle location and a time of day.

14. The method of claim 1, further including:
applying a privacy masking to secure privacy of the at least one occupant of the vehicle; and
forwarding an output of the standard vehicle camera to a privacy masking module to generate the standard vehicle camera-based region of interest (ROI) signal.

* * * * *